United States Patent
Sibahara

[11] Patent Number: 5,995,176
[45] Date of Patent: Nov. 30, 1999

[54] LIQUID CRYSTAL DISPLAY APPARATUS HAVING PIXELS OF DIFFERENT ORIENTATION OF LIQUID CRYSTAL CAPABLE OF SHIELDING LEAKAGE OF LIGHT THROUGH THE DISCONTINUITY OF ORIENTATION

[75] Inventor: Hideo Sibahara, Tokyo, Japan

[73] Assignee: NEC Corporation, Tokyo, Japan

[21] Appl. No.: 08/821,930

[22] Filed: Mar. 21, 1997

[30] Foreign Application Priority Data

Mar. 22, 1996 [JP] Japan ................................ 8-066399

[51] Int. Cl.⁶ ................. G02F 1/136; G02F 1/1343; G02F 1/1333
[52] U.S. Cl. ............... 349/44; 349/39; 349/139; 349/143; 349/111
[58] Field of Search ................. 349/129, 110, 349/39, 111, 143, 139, 44

[56] References Cited

U.S. PATENT DOCUMENTS

| | | | |
|---|---|---|---|
| 4,759,610 | 7/1988 | Yanagisawa | 350/334 |
| 4,787,712 | 11/1988 | Ukai et al. | 350/333 |
| 5,182,661 | 1/1993 | Ikeda et al. | 359/54 |
| 5,229,873 | 7/1993 | Hirose et al. | 359/55 |
| 5,233,211 | 8/1993 | Hayashi et al. | 349/44 |
| 5,303,072 | 4/1994 | Takeda et al. | 359/59 |
| 5,309,264 | 5/1994 | Lien et al. | 349/143 |
| 5,426,313 | 6/1995 | Sukegawa et al. | 349/44 |
| 5,459,595 | 10/1995 | Ishiguro et al. | 349/44 |
| 5,608,556 | 3/1997 | Koma | 349/143 |
| 5,710,611 | 1/1998 | Suzuki et al. | 349/38 |
| 5,724,107 | 3/1998 | Nishikawa et al. | 349/38 |
| 5,744,821 | 4/1998 | Song | 349/111 |
| 5,745,194 | 4/1998 | Nakashima et al. | 349/38 |
| 5,781,262 | 7/1998 | Suzuki et al. | 349/38 |

FOREIGN PATENT DOCUMENTS

| | | |
|---|---|---|
| 63-106624 | 5/1988 | Japan . |
| 64-88520 | 4/1989 | Japan . |
| 5-173142 | 7/1993 | Japan . |
| 5-196942 | 8/1993 | Japan . |
| 5-224210 | 9/1993 | Japan . |
| 6-214235 | 8/1994 | Japan . |
| 8-254706 | 10/1996 | Japan . |
| 8-271899 | 10/1996 | Japan . |

Primary Examiner—William L. Sikes
Assistant Examiner—Tarifur R. Chowdhury
Attorney, Agent, or Firm—Sughrue, Mion, Zinn, Macpeak & Seas, PLLC

[57] ABSTRACT

In a liquid crystal display apparatus including first and second substrates having a liquid crystal layer therebetween, a plurality of pixel electrodes formed over the first substrate, and a counter electrode formed on the second substrate, the liquid crystal layer is divided into a plurality of regions having different orientation of liquid crystal for one of the pixel electrodes, and openings are provided in the pixel electrodes in alignment with discontinuity of orientation of liquid crystal formed by the different orientation of liquid crystal. Also, a plurality of conductive light shield layers are provided in alignment with the openings. Further, a bias voltage is applied to the conductive light shield layers.

10 Claims, 12 Drawing Sheets

LIQUID CRYSTAL DISPLAY APPARATUS HAVING PIXELS OF DIFFERENT ORIENTATION OF LIQUID CRYSTAL CAPABLE OF SHIELDING LEAKAGE OF LIGHT THROUGH THE DISCONTINUITY OF ORIENTATION

BACKGROUND OF THE INVENTION

1. Field of the Invention

The present invention relates to an active matrix-type liquid crystal display (LCD) apparatus, and more particularly, to a twisted nematic (TN)-mode LCD apparatus having pixels of different orientation of liquid crystal.

2. Description of the Related Art

An active matrix-type LCD apparatus is thin, so that it is often used in various display apparatuses. In this type of active matrix-type LCD apparatus, since individual pixel electrodes are independently driven, the display contrast is not reduced based upon the reduction of a duty ratio.

As an active matrix-type LCD apparatus, a TN-mode type LCD apparatus where the orientation of liquid crystal between pixel electrodes and a counter electrode is twisted in an OFF state.

In a first prior art TN mode LCD apparatus, the orientation of liquid crystal for one pixel is uniform. This will be explained later in detail.

In the first prior art TN-mode LCD apparatus, however, since the orientation of liquid crystal molecules is not symmetrical with respect to the center thereof, the visual angle dependency characteristics are remarkably reduced.

In a second prior art TN-mode LCD apparatus, each liquid crystal for one pixel is divided into two TN layers. That is, a rubbing direction of one TN layer is opposite to a rubbing direction of the other TN layer. As a result, since the orientation of liquid crystal molecules is symmetrical with respect to the center thereof, the visual angle dependency characteristics are improved. This will also be explained later in detail.

In the second prior art TN-mode LCD apparatus, however, a discontinuity of orientation of liquid crystal is generated between the two TN layers. As a result, if the LCD apparatus is a normally-white-mode apparatus, leakage of light through the discontinuity of orientation of liquid crystal reduces the display contrast.

In a third prior art TN-mode LCD apparatus (see JP-A-5-224210), a light shield layer is provided at the discontinuity of orientation of liquid crystal, which reduces the leakage of light therethrough. This will also be explained later in detail.

In the third prior art TN-mode LCD apparatus, however, the alignment of the light shield layer with the location of the discontinuity of orientation of liquid crystal is unstable, and therefore, it is difficult for the light shield layer to completely shield leakage of light through the discontinuity of orientation of liquid crystal.

SUMMARY OF THE INVENTION

It is an object of the present invention to provide a LCD apparatus having pixels of different orientation of liquid crystal capable of completely shielding leakage of light through the discontinuity of orientation.

According to the present invention, in an LCD apparatus including first and second substrates having a liquid crystal layer therebetween, a plurality of pixel electrodes formed over the first substrate, and a counter electrode formed on the second substrate, the liquid crystal layer is divided into a plurality of regions having different orientation of liquid crystal for one of the pixel electrodes, and openings are provided in the pixel electrodes in alignment with discontinuity of orientation of liquid crystal formed by the different orientation of crystal. Also, a plurality of conductive light shield layers are provided in alignment with the openings. Further, a bias voltage is applied to the conductive light shield layers.

BRIEF DESCRIPTION OF THE DRAWINGS

The present invention will be more clearly understood from the description as set forth below, as compared with the prior art, with reference to the accompanying drawings, wherein.

DESCRIPTION OF THE PREFERRED EMBODIMENTS

Before the description of the preferred embodiments, prior art and earlier suggested LCD apparatuses will be explained with reference to FIGS. 1, 2A, 2B, 2C, 3A, 3B, 4A, 4B, 5A through 5F, 6A, 6B, 7A and 7B.

Figure 1:
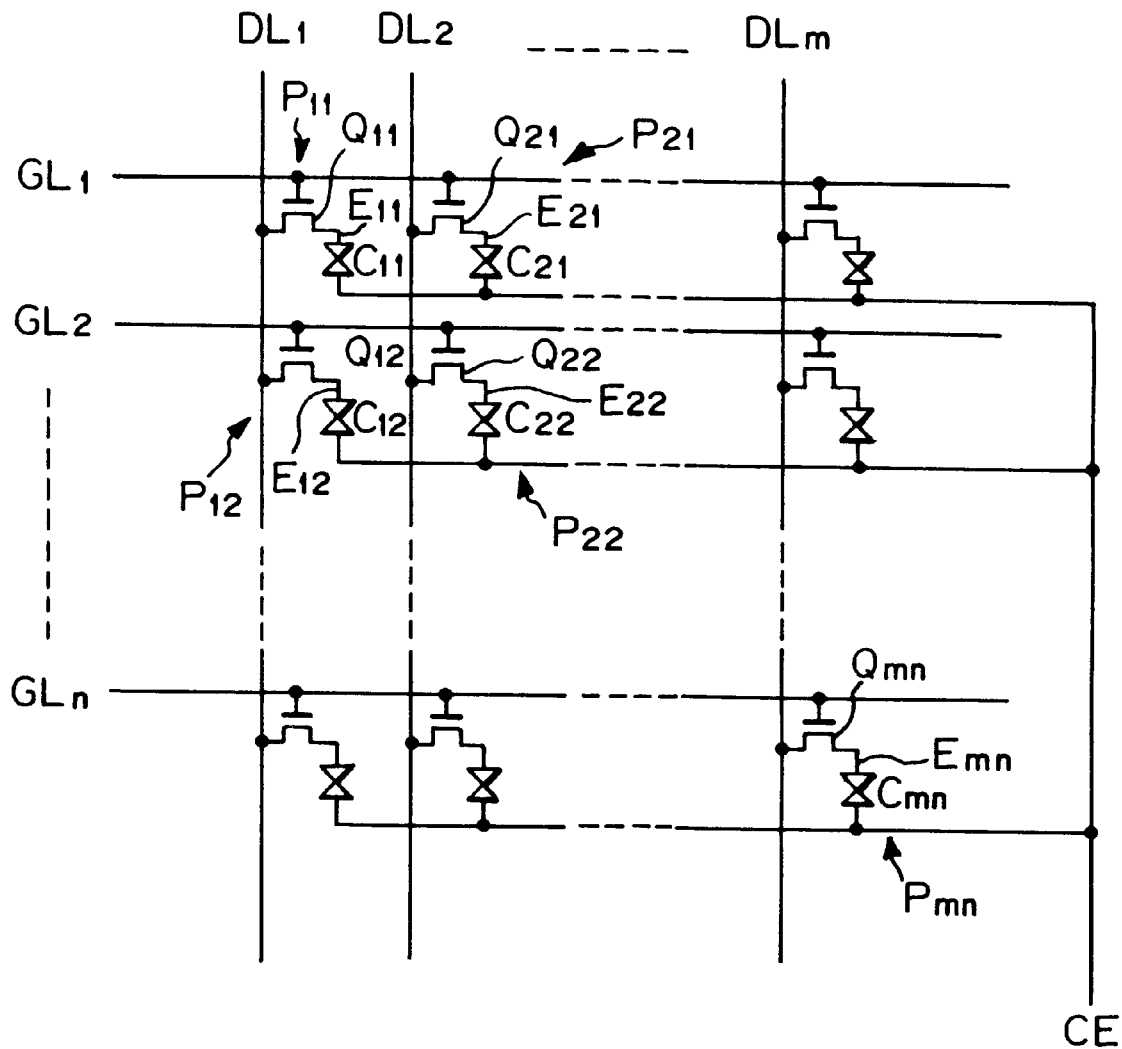
FIG. 1 is a circuit diagram illustrating a conventional active matrix-type LCD apparatus.

In FIG. 1, which is a circuit diagram illustrating a conventional active matrix-type LCD apparatus, references $DL_1, DL_2, \ldots, DL_m$ designate drain bus lines (or signal lines), and $GL_1, GL_2, \ldots, GL_n$ designate gate bus lines (or scan lines). A plurality of pixels $P_{11}, P_{12}, \ldots, P_{mn}$ are provided at intersections between the drain bus lines $DL_1, DL_2, \ldots, DL_m$ and the gate bus lines $GL_1, GL_2, \ldots, GL_n$. The pixels $P_{ij}$ (i=1, 2, ..., m; j=1, 2, ..., n) include a TFT $Q_{ij}$ and a liquid crystal cell $C_{ij}$.

Each of the TFTs $Q_{ij}$ (i=1, 2, ..., m; j=1, 2, ..., n) has a drain connected to one of the drain bus lines $DL_1$, $DL_2$, ..., $DL_n$, a gate connected to one of the gate bus lines $GL_1$, $GL_2$, ..., $GL_n$, and a source connected to a transparent pixel electrode $E_{ij}$ of the liquid crystal cell $C_{ij}$. The cell $C_{ij}$ is formed by the transparent electrode $E_{ij}$, a transparent counter electrode CE and a liquid crystal layer (not shown) therebetween. Note that the counter electrode CE is common for all the liquid crystal cells. In addition, the pixel electrode $E_{ij}$ is connected to a storage capacitor (not shown) to substantially increase the capacity of the pixels, thus improving the data retention characteristics of the liquid crystal cell $C_{ij}$.

Figure 2A:
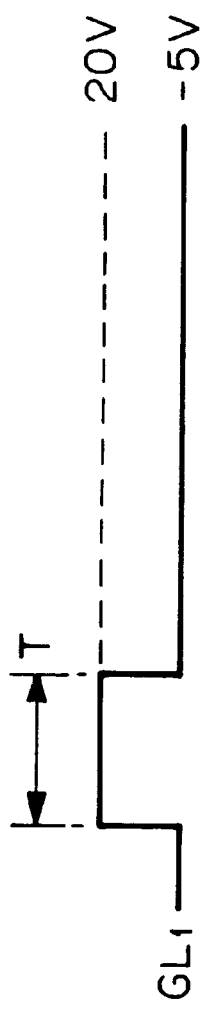
FIGS. 2A, 2B and 2C are timing diagrams showing the operation of the apparatus of FIG. 1.
Figure 2B:
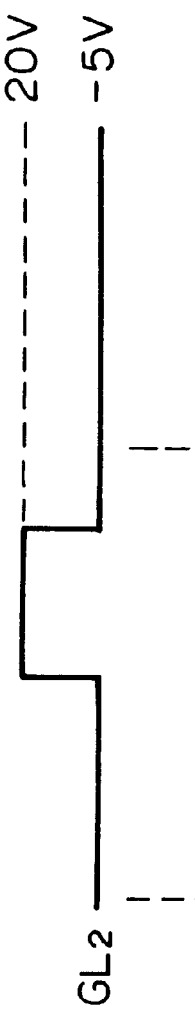
Figure 2C:
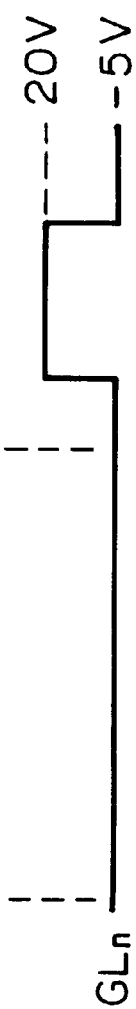

As shown in FIGS. 2A, 2B, and 2C, only when each of the gate bus lines $GL_1$, $GL_2$, ..., $GL_n$ is activated for a short time, are the voltages thereof made high, for example, 20 V. As a result, the TFTs $Q_{11}$, $Q_{21}$, ..., $Q_{m1}$ connected to the activated gate bus line such as $GL_1$ are turned ON, so that signals at the drain bus lines $DL_1$, $DL_2$, ..., $DL_n$ are written into the liquid crystal cell $C_{11}$, $C_{21}$, ..., $C_{m1}$, respectively. Otherwise, the gate bus lines $GL_1$, $GL_2$, ..., $GL_n$, remain at a definite voltage such as −5 V. Note that, if a time period of one frame is 1/60 sec, the duration T of a pulse applied to the gate bus lines $GL_1$, $GL_2$, ..., $GL_n$ is 1/(60n).

Figure 3B:
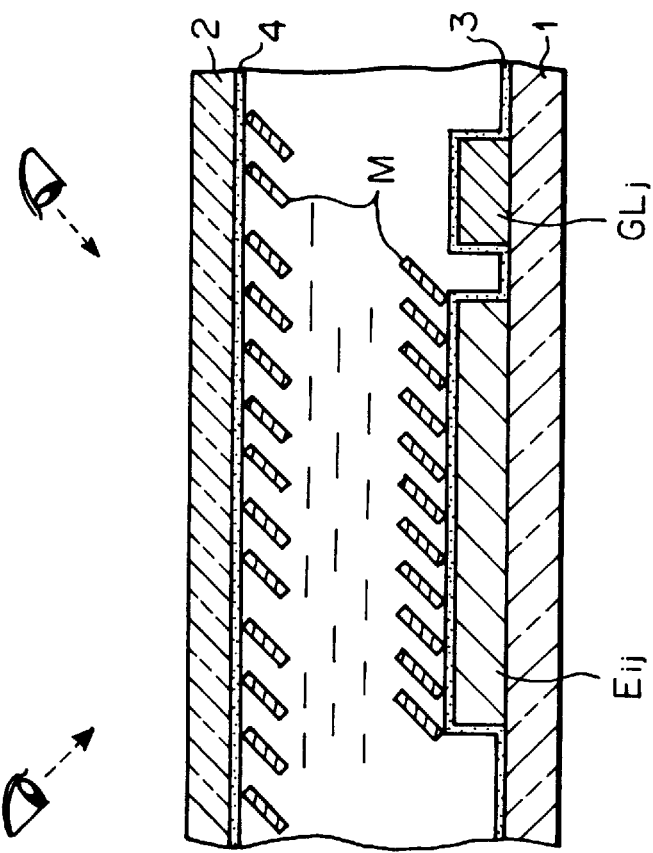
FIG. 3B is a cross-sectional view taken along the line B—B of FIG. 3A.

Also, a transparent substrate or a glass substrate, on which the TFTs $Q_{ij}$ and the pixel electrodes $E_{ij}$ are formed, is called a TFT substrate 1 (see FIG. 3B). On the other hand, a transparent substrate or a glass substrate on which the counter electrode CE is formed is called a color filter substrate 2 (see FIG. 3B), since color filters are usually formed on this substrate to realize a color display unit.

In the active matrix-type LCD apparatus, a TN-mode is adopted, so that the orientation of liquid crystal is twisted between the TFT substrate and the color filter substrate in an OFF state.

Figure 3A:
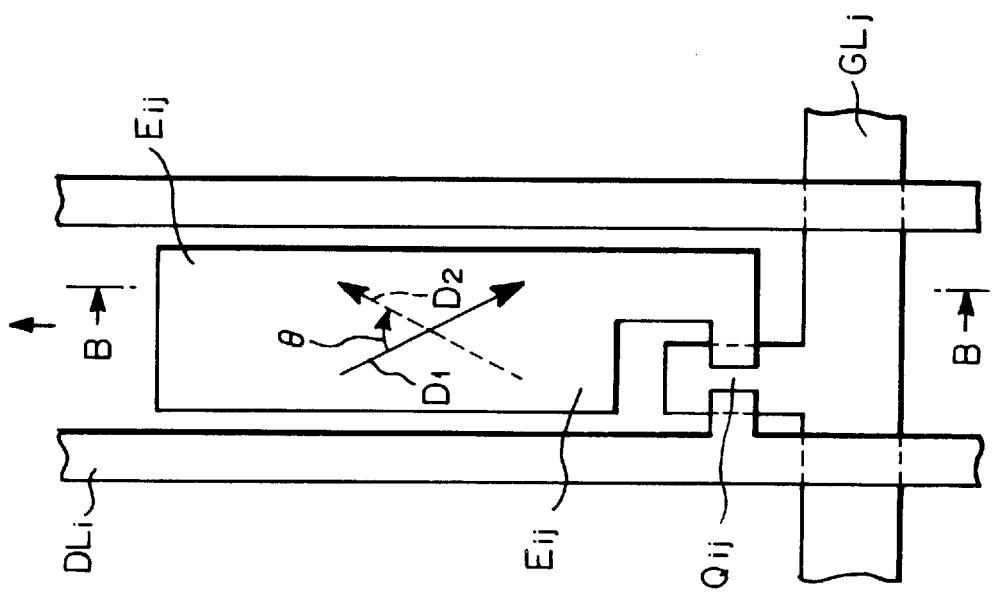
FIG. 3A is a plan view illustrating a first prior art TN-mode LCD apparatus.

FIG. 3A is a plan view illustrating a first prior art TN-mode LCD apparatus, and FIG. 3B is a cross-sectional view taken along the line B—B of FIG. 3A. As illustrated in FIG. 3B, oriented layers 3 and 4 are formed on the glass substrates 1 and 2, respectively. A rubbing process in a direction $D_1$ at an angle of +45° as illustrated in FIG. 3A is performed upon the oriented layer 3 of FIG. 3B. On the other hand, a rubbing process in a direction $D_2$ at an angle of −45° as illustrated in FIG. 3A is performed upon the oriented layer 4 of FIG. 3B. As a result, a twisted angle θ of liquid crystal molecules can be obtained in an OFF state.

In the first prior art TN-mode LCD apparatus as illustrated in FIGS. 3A and 3B, however, since the orientation of liquid crystal molecules as indicated by M in FIG. 3B is not symmetrical with respect to the center thereof, the visual angle dependency characteristics are remarkably reduced.

Figure 4B:
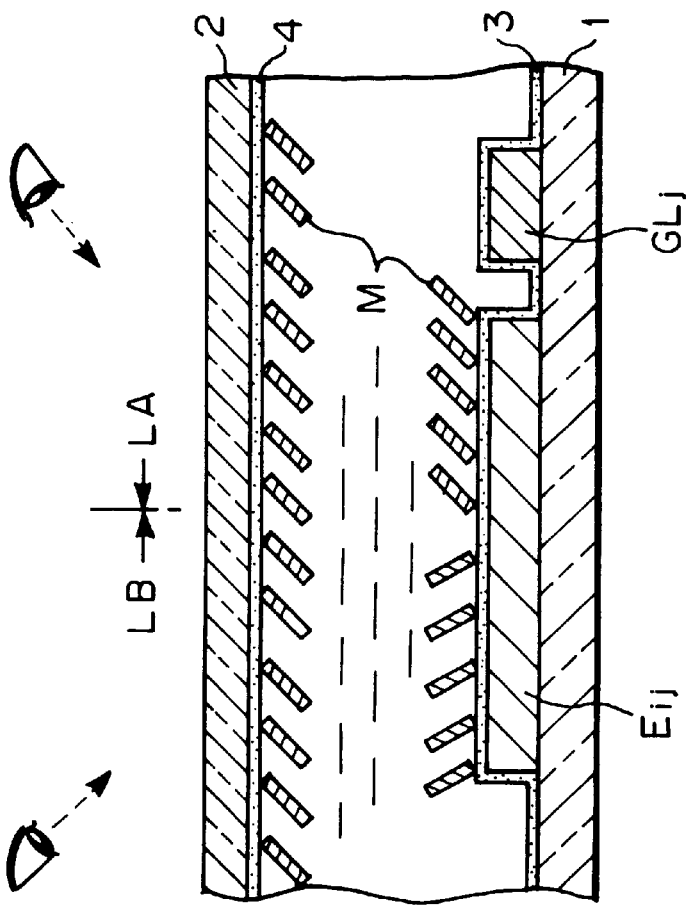
FIG. 4B is a cross-sectional view taken along the line B—B of FIG. 4A.
Figure 4A:
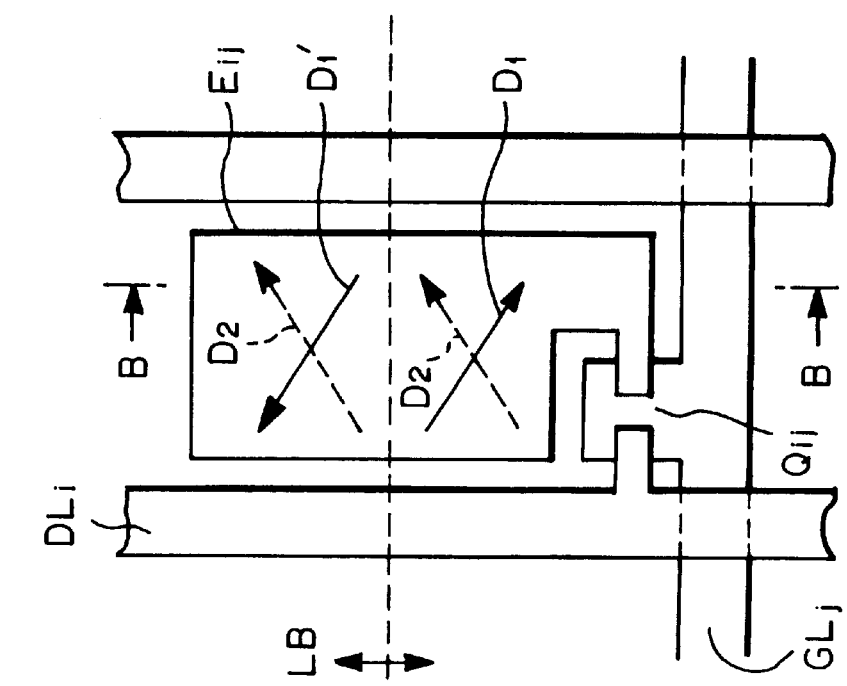
FIG. 4A is a plan view illustrating a second prior art TN-mode LCD apparatus.

FIG. 4A is a plan view illustrating a second prior art TN-mode LCD apparatus, and FIG. 4B is a cross-sectional view taken along the line B—B of FIG. 4A (see JP-A-63-106624 & JP-A-64-88520). As illustrated in FIGS. 4A and 4B, each liquid crystal layer is divided into two TN layers LA and LB. A rubbing direction $D_1$ of the TN layer LA is opposite to a rubbing direction $D_1'$ of the TN layer LB. As a result, since the orientation of liquid crystal molecules as indicated by M in FIG. 4B is symmetrical with respect to the center thereof, the visual angle dependency characteristics are improved.

The method for manufacturing the oriented layer 3 of the TN-mode LCD apparatus of FIGS. 4A and 4B is explained next with reference to FIGS. 5A through 5F (see JP-A-5-196942).

Figure 5A:
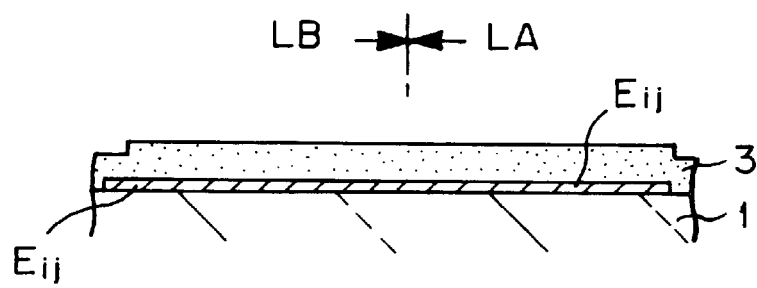
FIGS. 5A through 5F are cross-sectional views for explaining the manufacturing method of the oriented layer of TN-mode LCD apparatus of FIGS. 4A and 4B.
Figure 5B:
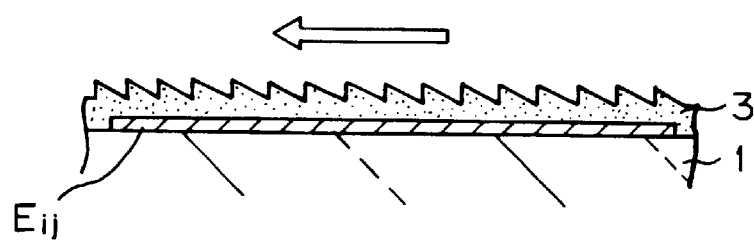
Figure 5C:
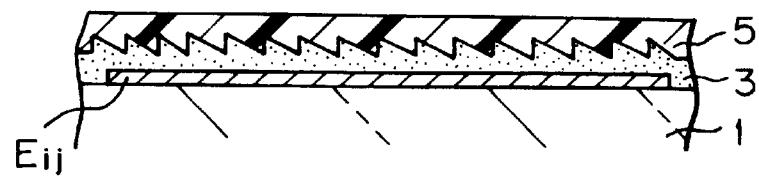
Figure 5D:
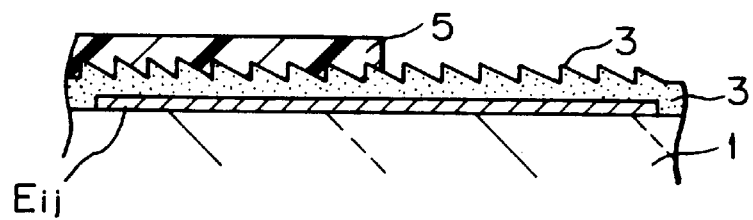

First, referring to FIG. 5A, the oriented layer 3 is coated on the pixel electrode $E_{ij}$ which is formed on the glass substrate 1. Next, referring to FIG. 5B, a rubbing operation as indicated by an arrow is performed the oriented layer 3. Next, referring to FIG. 5C, a photoresist layer 5 is coated, and thereafter, as shown in FIG. 5D, the photoresist layer 5 is patterned by a photolithography process. Next, referring to FIG. 5E, a rubbing operation as indicated by an arrow is performed on the oriented layer 3. Finally, referring to FIG. 5E, the photoresist layer 5 is removed. Thus, the oriented layer 3 is completed.

In the second prior art TN-mode LCD apparatus as illustrated in FIGS. 4A and 4B, however, a discontinuity of orientation of liquid crystal is generated between the TN layers LA and LB. As a result, if the LCD apparatus is a normally-white-mode apparatus, leakage of light through the discontinuity of orientation of liquid crystal, reduces the display contrast.

Figure 6A:
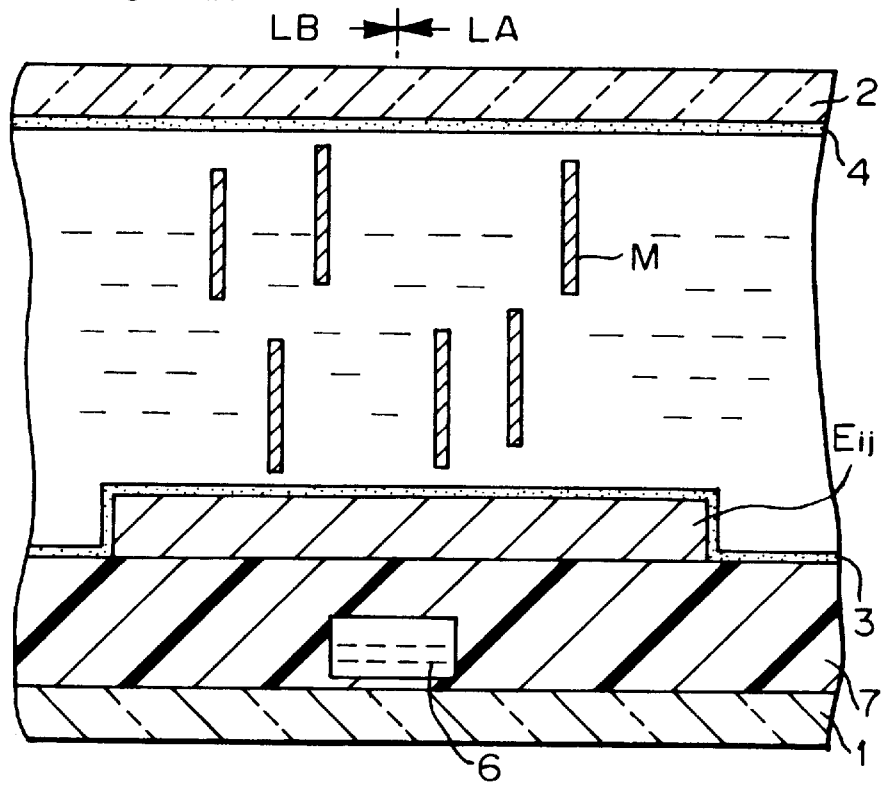
FIGS. 6A and 6B are cross-sectional views illustrating a third prior art TN-mode LCD apparatus.
Figure 6B:
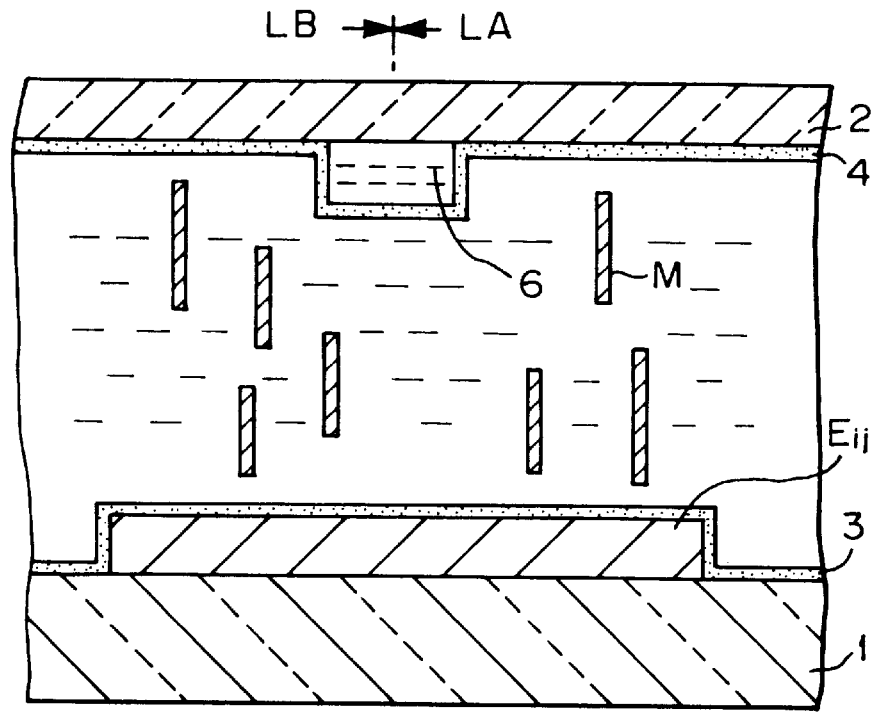

In FIGS. 6A and 6B, which illustrate a third prior art TN-mode LCD apparatus (see JP-A-5-224210), a light shield layer 6 is provided at the discontinuity of orientation of liquid crystal, which reduces the leakage of light therethrough. In FIG. 6A, the light shield layer 6 is provided on the side of the substrate 1, and in addition, the light shield layer 6 is buried in an insulating layer 7. On the other hand, in FIG. 6B, the light shield layer 6 is provided on the side of the substrate 2.

Figure 5E:
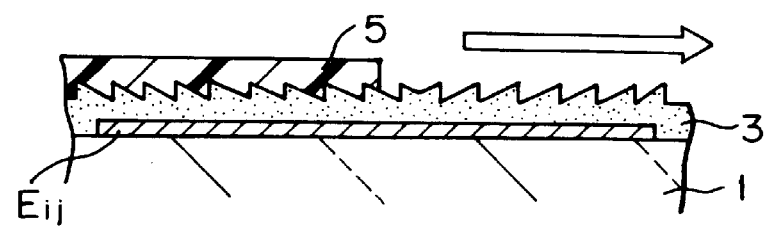
Figure 5F:
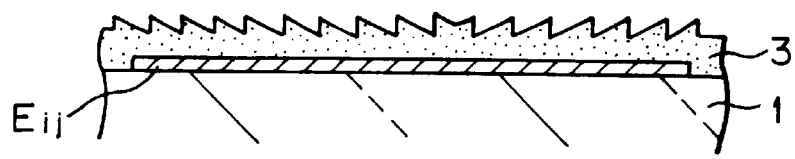

In the third prior art TN-mode LCD apparatus as illustrated in FIGS. 6A and 6B, the location of the discontinuity of orientation of liquid crystal may be shifted from an optimum location due to the deviation of the photoresist layer 5 as shown in FIGS. 5D and 5E. As a result, the alignment of the light shield layer 6 with the location of the discontinuity of orientation of liquid crystal is unstable, and therefore, it is difficult for the light shield layer 6 to completely shield leakage of light through the discontinuity of orientation of liquid crystal. If the region of the light shield layer 6 is sufficiently large, the deviation of the location of the discontinuity of orientation of liquid crystal can be compensated for; however, in this case, the numerical aperture of the apparatus is reduced.

Figure 7A:
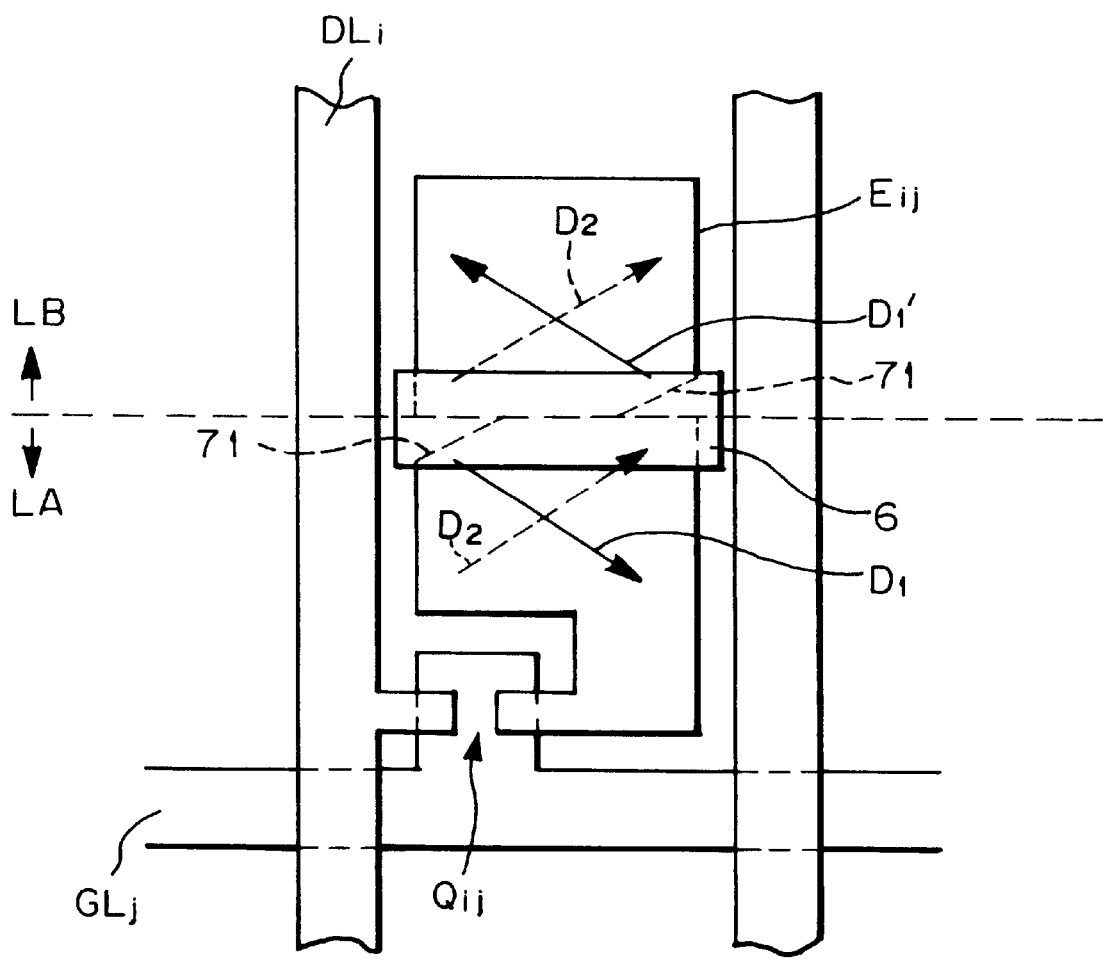
FIGS. 7A and 7B are plan views illustrating an earlier suggested TN-mode LCD apparatus.
Figure 7B:
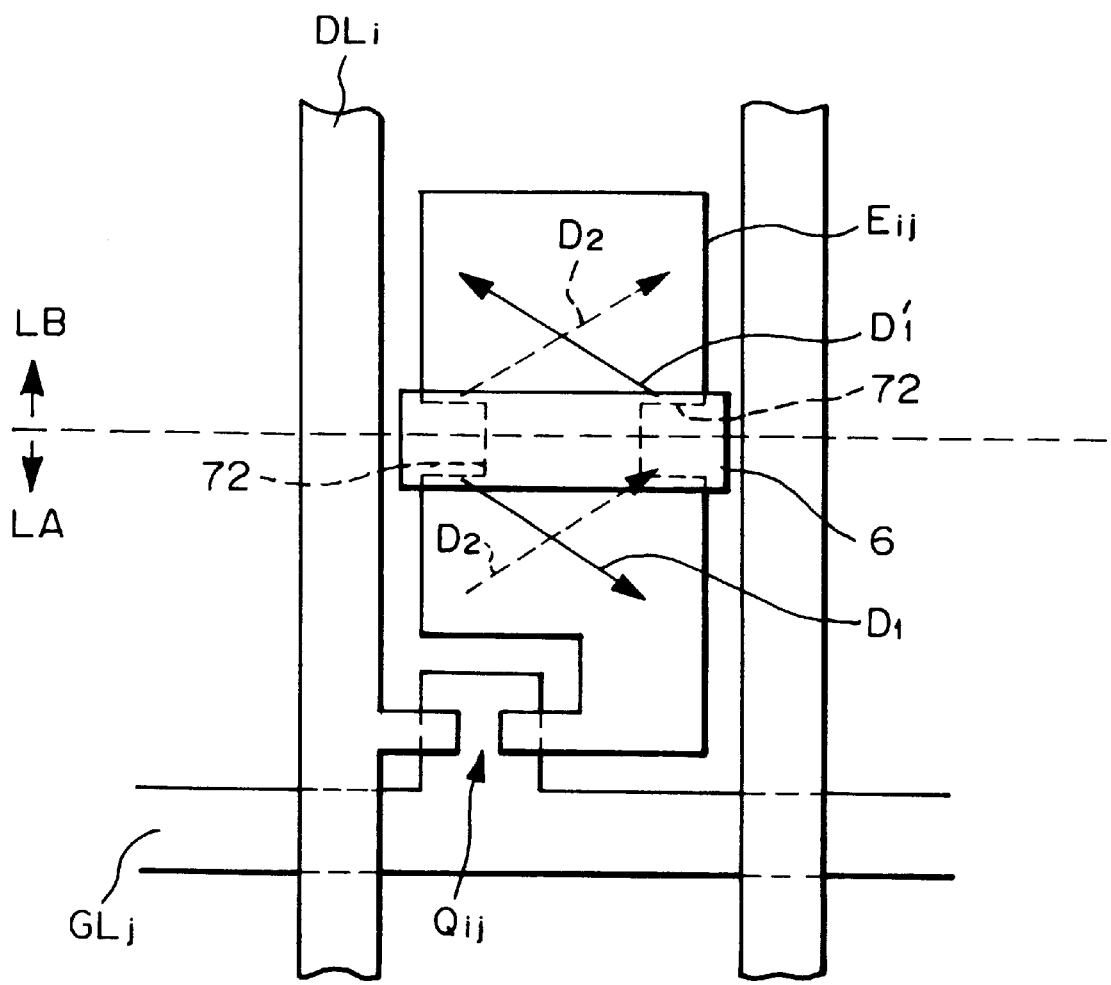

In FIGS. 7A and 7B, which illustrate an earlier suggested TN-mode LCD apparatus (see Japanese Patent Application No. 7-49637 filed on Mar. 9, 1997), the shape of the pixel electrode $E_{ij}$ is changed to stabilize the region of the discontinuity of orientation of liquid crystal. That is, wedge-shaped openings 71 and U-shaped openings 72 are formed in the pixel electrode $E_{ij}$ of FIGS. 7A and 7B, respectively, so that an electric field is focussed on the discontinuity of orientation of liquid crystal. Thus, a region of the discontinuity of orientation of liquid crystal is reduced. In addition, the light shield layer 6 covers the reduced region of the discontinuity of orientation of liquid crystal, so as to reduce the leakage of light therethrough.

In the TN-mode LCD apparatus as illustrated in FIGS. 7A and 7B, however, the light shield layer 6 is electrically in a floating state. As a result, in order to effectively stabilize the location of the discontinuity of orientation of liquid crystal, the size of the openings 71 and 72 cannot be reduced. Therefore, the light shield layer 6 has to be large in size, which reduces the numerical aperture of the apparatus.

Figure 8A:
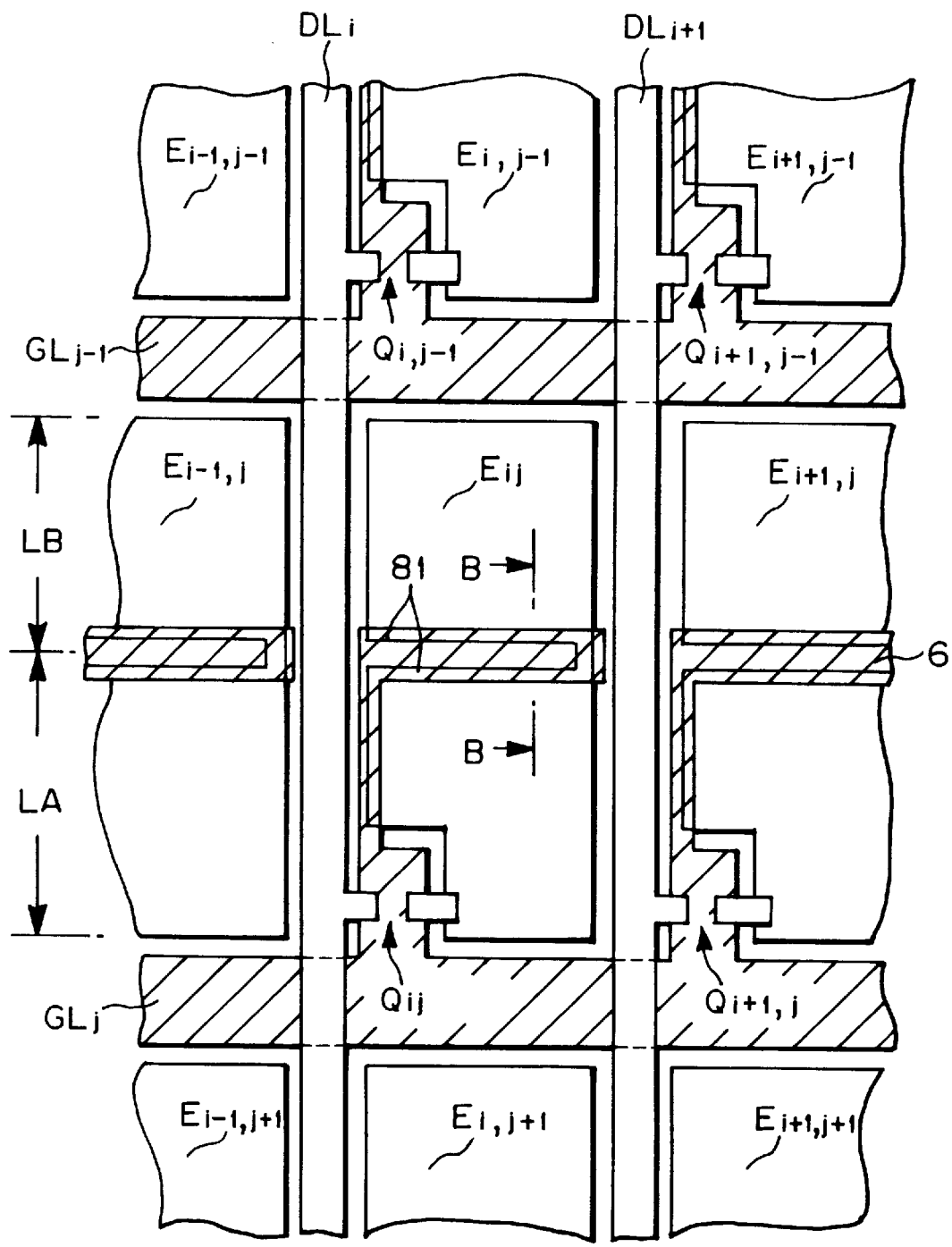
FIG. 8A is a plan view illustrating a first embodiment of the TN-mode LCD apparatus according to the present invention.
Figure 8B:
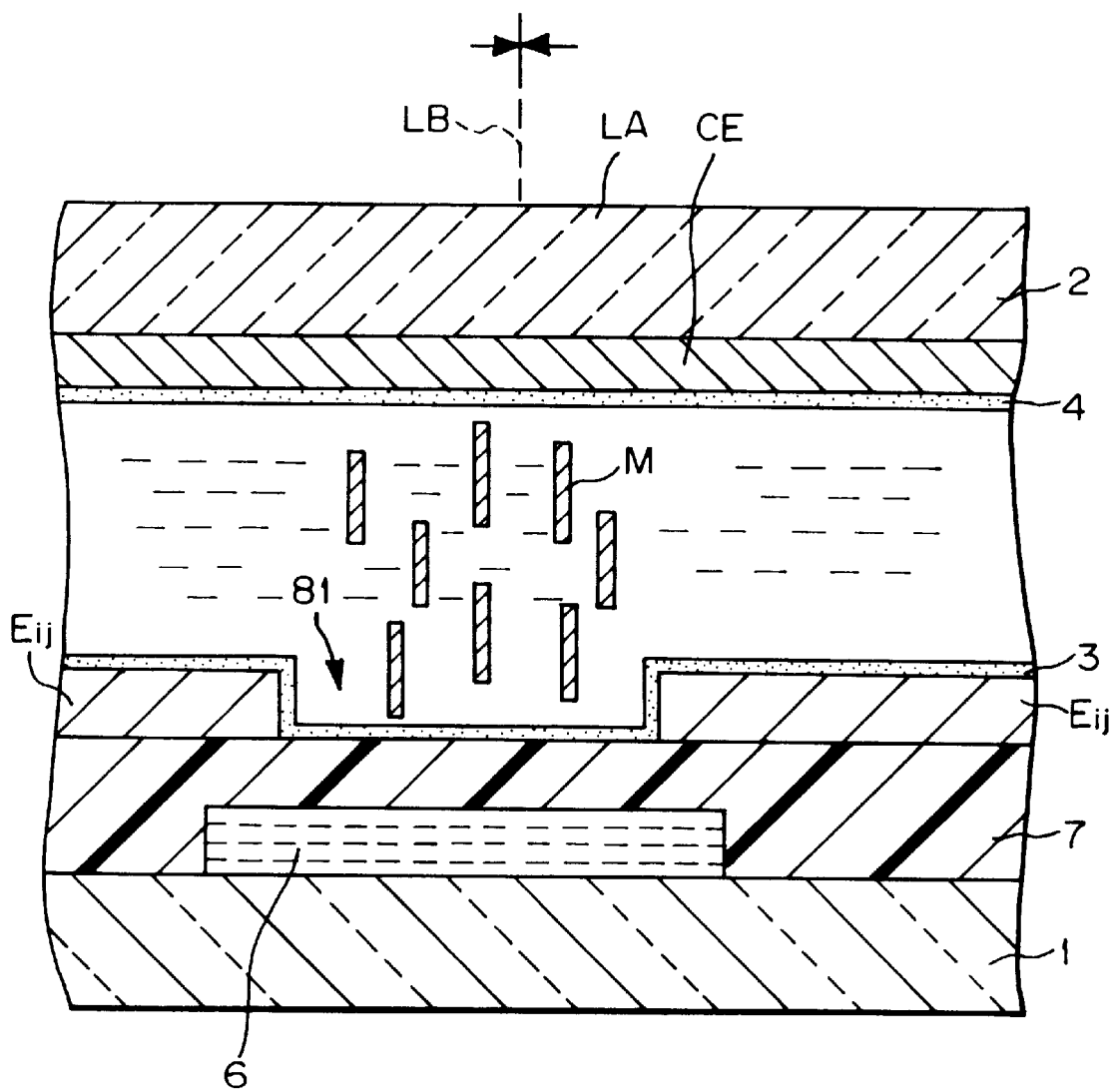
FIG. 8B is a cross-sectional view taken along the line B—B of FIG. 8A.

FIG. 8A is a plan view illustrating a first embodiment of the TN-mode LCD apparatus according to the present invention and FIG. 8B is a cross-sectional view taken along the line B—B of FIG. 8A. In FIGS. 8A and 8B, the light shield layer 6 made of a conductive layer is connected to the corresponding gate bus line such as $GL_j$. Therefore, if the LCD apparatus is a normally-white-mode apparatus, a gate voltage of TFT $Q_{ij}$ such as −5 V is applied to the light shield layer 6 and a definite voltage such as +5 V is applied to the counter electrode CE, so that an electric field caused by the voltages +5 V and −5 V is applied to the region of the discontinuity of orientation of liquid crystal, thus stabilizing this region.

Even in FIGS. 8A and 8B, an opening 81 is formed in the electrode $E_{ij}$; however, the width of the opening 81 can be smaller than that of the openings 71 and 72 of FIGS. 7A and 7B. This is because the location of the discontinuity of orientation of liquid crystal is more effectively stabilized due to the application of the gate voltage of the TFTs to the light shield layer 6. For example, the width of the opening 81 is about 6 µm, while the openings 71 and 72 of FIGS. 7A and 7B are about 12 µm, and therefore, the numerical aperture can be increased by 1.6 percent.

Figure 9A:
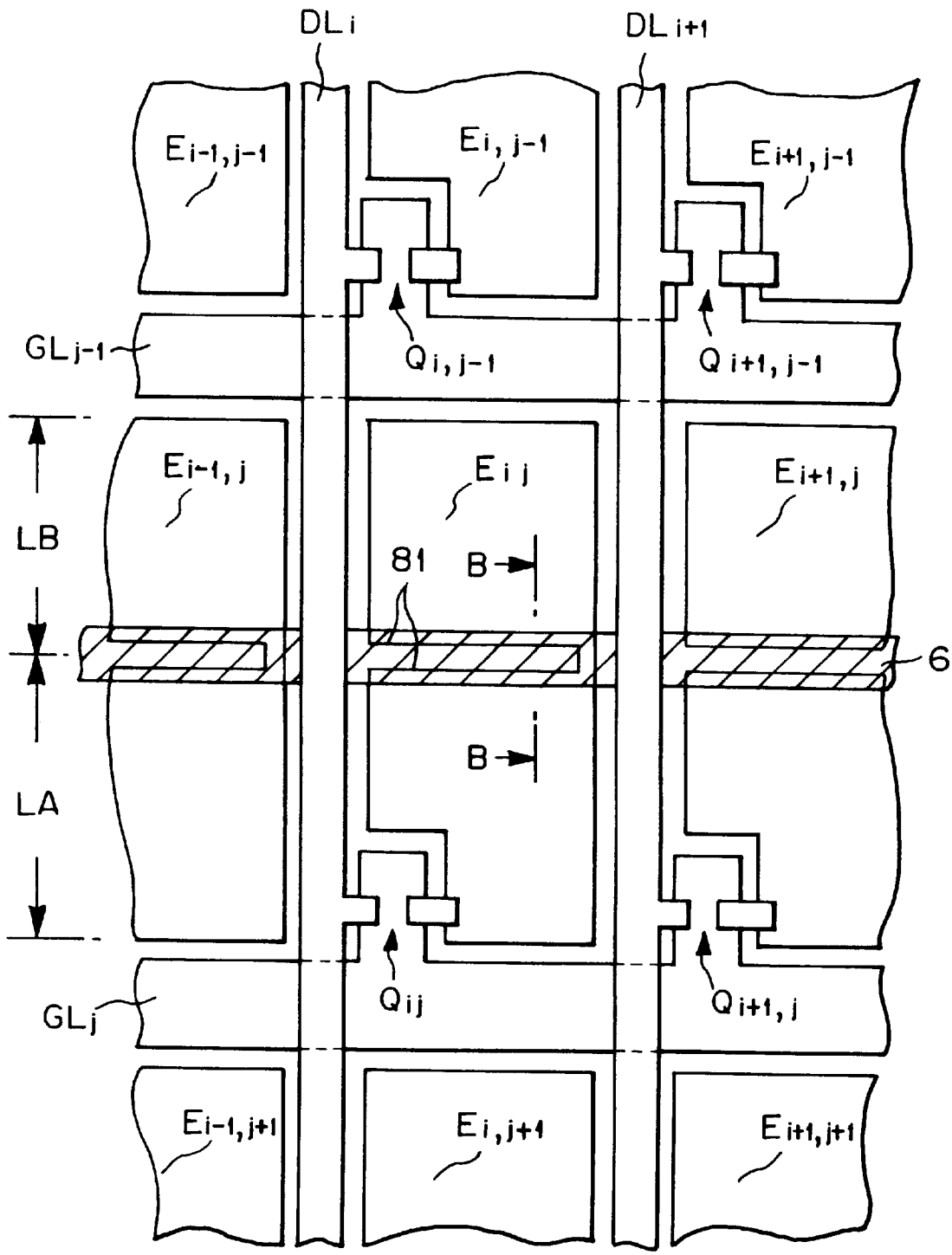
FIG. 9A is a plan view illustrating a second embodiment of the TN-mode LCD apparatus according to the present invention.
Figure 9B:
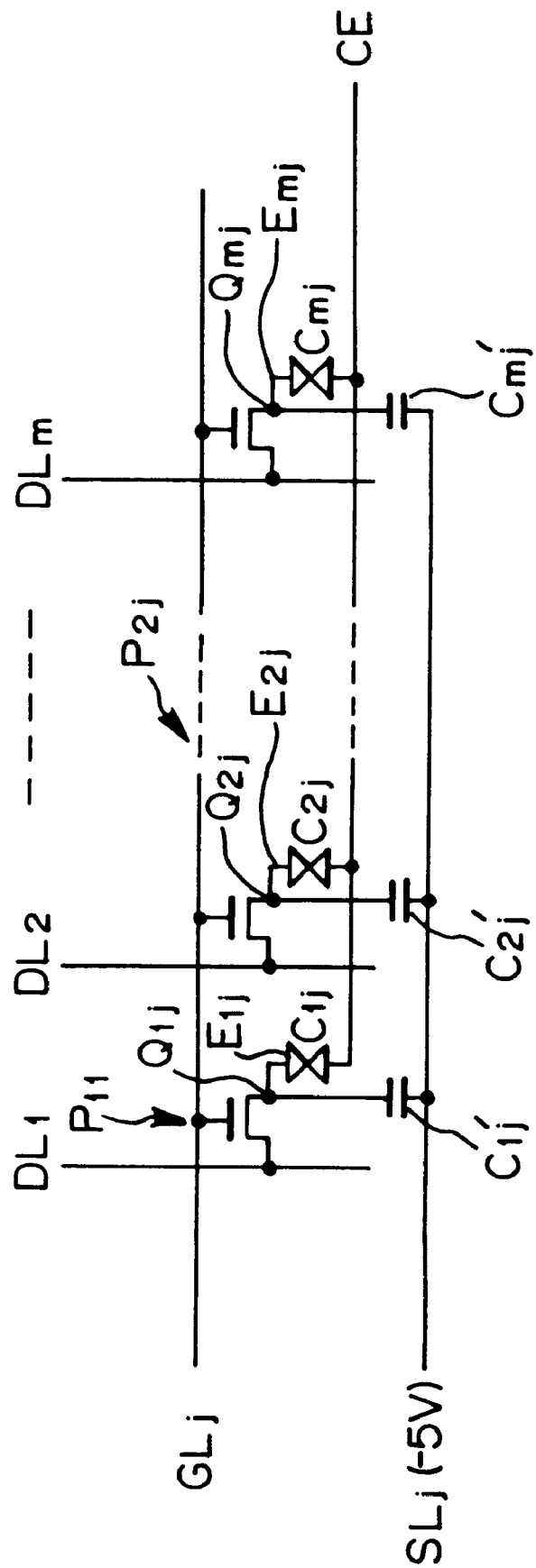
FIG. 9B is a circuit diagram of the LCD apparatus of FIG. 9A.

FIG. 9A is a plan view illustrating a second embodiment of the TN-mode LCD apparatus according to the present invention and FIG. 9B is a circuit diagram of the LCD apparatus of FIG. 8A. In FIGS. 9A and 9B, the light shield layer 6 serves as a storage capacitor line such as $SL_j$. Note that a cross-sectional view taken along the line B—B of FIG. 9A is also illustrated in FIG. 8B. Therefore, the storage capacitor line $SL_j$, the electrode $E_{ij}$ and the insulating layer 7 therebetween form a storage capacitor such as $C_{ij}'$, in parallel with the cell $C_{ij}$ which substantially increases the capacitance of the cell $C_{ij}$. Therefore, the voltage of the storage capacitor line such as −5 V is applied to the light shield layer 6 and a definite voltage such as +5 V is applied to the counter electrode CE, so that an electric field caused by the voltages −5 V and +5 V is applied to the region of the discontinuity of orientation of liquid crystal, thus stabilizing this region, in the same way as in the first embodiment.

As explained hereinabove, according to the present invention, leakage of light through the discontinuity of orientation of liquid crystal can be completely shielded.

I claim:

1. A liquid crystal display apparatus comprising
   first and second substrates having a liquid crystal layer therebetween;
   a plurality of pixel electrodes formed over said first substrate, said liquid crystal layer being divided into a plurality of regions having different orientation of liquid crystal for one of said pixel electrodes, openings being provided in said pixel electrodes in alignment with discontinuity of orientation of liquid crystal formed by said different orientation of liquid crystal;
   a plurality of conductive light shield layers each provided in alignment with one of said openings, a bias voltage being applied to said conductive light shield layers; and
   a counter electrode formed on said second substrate.

2. The apparatus as set forth in claim 1, further comprising a plurality of TFTs formed over said first substrate, each of said TFTs being connected to one of said pixel electrodes,
   each of said conductive light shield layers being connected to a gate electrode of a respective one of said TFTs.

3. The apparatus as set forth in claim 1, further comprising a plurality of storage capacitor lines,
   each of said conductive light shield layers being connected to a respective one of said storage capacitor lines.

4. The apparatus as set forth in claim 1, wherein said conductive light shield layers are provided on said first substrate.

5. The apparatus as set forth in claim 1, further comprising an insulating layer between said pixel electrodes and said conductive light shield layers.

6. The apparatus as set forth in claim 1, further comprising:
   a first oriented layer formed on said pixel electrodes, a plurality of different rubbing operations being performed upon said first oriented layer for said different orientation of liquid crystal; and
   a second oriented layer formed on said counter electrode, a rubbing operation being performed upon said second oriented layer.

7. A liquid crystal display apparatus comprising:
   first and second substrates having a liquid crystal layer therebetween;
   a plurality of pixel electrodes formed over said first substrate, said liquid crystal layer being divided into a plurality of regions having different orientation of liquid crystal for one of said pixel electrodes, openings being provided in said pixel electrodes in alignment with discontinuity of orientation of liquid crystal formed by said different orientation of liquid crystal;
   a plurality of conductive light shield layers formed on said first substrate and each of said conductive light shield layers being provided in alignment with one of said openings;
   an insulating layer between said pixel electrodes and said conductive light shield layer;
   a counter electrode formed on said second substrate; and
   a plurality of TFTs formed over said first substrate, each of said TFTs being connected to one of said pixel electrodes,
   each of said conductive light shield layers being connected to a gate electrode of a respective one of said TFTs.

8. The apparatus as set forth in claim 7, further comprising:
   a first oriented layer formed on said pixel electrodes, a plurality of different rubbing operations being performed upon said first oriented layer for said different orientation of liquid crystal; and
   a second oriented layer formed on said counter electrode, a rubbing operation being performed upon said second oriented layer.

9. A liquid crystal display apparatus comprising:
   first and second substrates having a liquid crystal layer therebetween;
   a plurality of pixel electrodes formed over said first substrate, said liquid crystal layer being divided into a plurality of regions having different orientation of liquid crystal for one of said pixel electrodes, openings being provided in said pixel electrodes in alignment with discontinuity of orientation of liquid crystal formed by said different orientation of liquid crystal;
   a plurality of conductive light shield layers formed on said first substrate and each of said conductive light shield layers being provided in alignment with one of said openings;

an insulating layer between said pixel electrodes and said conductive light shield layer;

a counter electrode formed on said second substrate; and a plurality of storage capacitor lines, each of said conductive light shield layers being connected to a respective one of said storage capacitor lines.

10. The apparatus as set forth in claim 9, further comprising:

a first oriented layer formed on said pixel electrodes, a plurality of different rubbing operations being performed upon said first oriented layer for said different orientation of crystal; and a second oriented layer formed on said counter electrode, a rubbing operation being performed upon said second oriented layer.

\* \* \* \* \*